(12) United States Patent
Yonezawa

(10) Patent No.: US 6,397,356 B1
(45) Date of Patent: May 28, 2002

(54) ALTERNATIVE PATH CONTROL SYSTEM AND METHOD

(75) Inventor: Naomichi Yonezawa, deceased, late of Shizuoka (JP), by Tsuruko Yonezawa, legal representative

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/323,120

(22) Filed: Jun. 1, 1999

(30) Foreign Application Priority Data

Jun. 2, 1998 (JP) .......................................... 10-153288

(51) Int. Cl.⁷ ............................................... G06F 11/00
(52) U.S. Cl. ........................................... 714/43; 710/38
(58) Field of Search .............................. 714/43, 44, 47, 714/56, 6, 25, 37; 710/15, 17, 20, 36, 65, 38, 40

(56) References Cited

U.S. PATENT DOCUMENTS

| | | | |
|---|---|---|---|
| 5,297,262 A | * 3/1994 | Cox et al. ..................... | 395/325 |
| 5,388,254 A | * 2/1995 | Betz et al. .................... | 395/575 |
| 5,944,838 A | * 8/1999 | Jantz ............................. | 714/6 |
| 5,996,086 A | * 11/1999 | Delaney et al. ................ | 714/4 |
| 6,067,545 A | * 5/2000 | Wolff ............................ | 707/10 |
| 6,105,122 A | * 8/2000 | Muller et al. .................. | 712/1 |
| 6,178,520 B1 | * 1/2001 | DeKoning et al. ............. | 714/5 |
| 6,185,601 B1 | * 2/2001 | Wolff ............................ | 709/203 |

FOREIGN PATENT DOCUMENTS

JP 8-212147 8/1996

* cited by examiner

*Primary Examiner*—Nadeem Iqbal
(74) *Attorney, Agent, or Firm*—Sughrue Mion., PLLC

(57) ABSTRACT

An information processing system of the invention includes a first system to which a first device is connected, that produces a request for the first device; a second system which is independent from the first system. The first system includes a first element which outputs the request to the second system. The second system has a second element which receives the request from the first element and outputs the request to the first system. The first system also has a third element which receives the request from the second element and outputs the request to the first device. A method for providing an alternative path for an information processing system which includes a first system, to which a first device is connected, that produces a request for the first device and a second system which is independent from the first system, wherein the first system includes a first element and a third element which is provided between the first element and the first device, wherein the second system includes a second element, includes first outputting the request from the first element to the second element; second outputting the request from the second element to the third element; and third outputting the request from the third element to the first device.

18 Claims, 17 Drawing Sheets

ALTERNATIVE PATH CONTROL SYSTEM AND METHOD

BACKGROUND OF THE INVENTION

The present invention relates to an information processing system and method, and more particularly, to an information processing system and a method which manages an alternative path when the system accesses an I/O device.

Referring to FIG. 17, in a conventional alternative path control system of this type, systems 401 and 402 each have independent I/O buses and a path for transferring a request between the systems. System 401 includes CPU 411, transfer control element 412, Peripheral Component Interconnect (PCI) bridges 413 and 414, I/O buses 415 and 416, and Small Computer Serial Interface (SCSI) card 417. System 402 includes CPU 421, transfer control element 422, PCI bridges 423 and 424, I/O buses 425 and 426, and SCSI card 427.

CPUs 411 and 421 are processors that perform information processing independently of each other. Transfer control elements 412 and 422 receive I/O requests outputted from CPUs 411 and 421, determine which ports of their own system or other systems the I/O requests are to be transferred to, and transfer the requests. PCI bridges 413, 414, 423 and 424 receive requests from transfer control elements 412 and 422, convert them into the protocol of a PCI bus and transfer them. I/O buses 415, 416, 425 and 426 are PCI buses that connect I/O devices. SCSI cards 417 and 427 are SCSI control cards that are connected to the PCI buses. A disk device 43 is an external storage connected to SCSI cards 417 and 427.

In this conventional system, when SCSI card 417 is accessed, for example, it is necessary to always use a path including PCI bridge 413. This creates problem because it is impossible to access SCSI card 417 if PCI bridge 413 fails.

To address this problem of the path for an I/O access, for example, SCSI cards 417 and 427 are connected to I/O buses 415 and 425, respectively. Specifically, two I/O cards (SCSI cards) on different I/O buses are cross-connected to an external I/O device such as disk device 43 as shown in FIG. 17. Thus, if SCSI card 417 cannot be used because of a failure in PCI bridge 413, an access path to disk device 43 is secured by going through SCSI card 427 provided under PCI bridge 423 of other system 402.

Another alternative path selecting system when a failure occurrs is described in Japanese laid-open publication Hei No.8-212147. This publication discloses a channel processing apparatus which manages and controls channel paths for selectively transferring information between a CPU and one of the I/O devices. The apparatus replaces the physical channel number and the logical channel number related to a channel path, on which a failure has occurred, with the physical channel number and the logical channel number related to a channel path not used by the operating system.

Japanese laid-open publication Hei No.3-105540 discloses an input/output control method that makes it possible to perform an input/output request even when a measure is being taken to cope with channel trouble, by identifying an input/output path as being faulty and notifying an I/O processor, which is hardware for controlling a channel, not to select the faulty input/output path.

These methods cannot be applied to the system shown in FIG. 17, because the configurations are different.

In above-described conventional system, two I/O cards, each of which is mounted to each independent apparatus, are required for switching over a path for one device, such as a disk device or the like. A problem is caused because the number of kinds of I/O cards which are mounted in an apparatus is restricted.

Moreover, the above-described conventional system is applicable only to an I/O device having two or more input ports. This creates another problem because it is impossible to apply the above-described configuration to an I/O device having only one port.

Another problem is caused because the system requires dedicated support software. Such dedicated support software is used for recognizing each I/O card which forms crossing paths and determining which path is to be used when one of the paths cannot be used because of a failure on any part of the path.

SUMMARY OF THE INVENTION

An object of the invention is to provide an alternative path control system which creates an alternative path to an I/O device without using a plurality of I/O cards.

Another object of the invention is to provide an alternative path control system that is not dependent on the number of ports of I/O devices and the like to be connected.

Another object of the invention is to provide an alternative path control system which does not require any special software for handling the alternative path. Specifically, in the alternative path of the invention, a request does not need information which designates the alternative path.

According to one aspect of the present invention, an information processing system is provided which includes: a first system in which a first device is provided and produces a request for the first device, wherein the first system includes a first element which is connected to the first device and has at least two inputs, a second element which receives the request and outputs the request to one of the inputs of the first element, and a third element which outputs the request to the second element; a second system in which a second device is provided and which has a fourth element which is connected to the second device and has at least two inputs, a fifth element which receives the request and outputs the request to one of the inputs of the fourth element, and a sixth element which outputs the request to the fifth element; wherein the third element outputs the request to the sixth element when there is a failure on the path from the third element to the first element; and wherein the fifth element outputs the request to one of the inputs of the first element.

According to another aspect of the present invention, an information processing system is provided which includes: a first system to which a first device is connected and which produces a request for the first device; a second system which is independent from the first system; a first element which is provided in the first system and outputs the request to the second system; a second element which is provided in the second system, receives the request from the first element and outputs the request to the first system; and a third element which is provided in the first system, receives the request from the second element and outputs the request to the first device.

According to another aspect of the present invention, a method for providing an alternative path for an information processing system which includes a first system to which a first device is connected and which produces a request for the first device and a second system which is independent from the first system, wherein the first system includes a first element and a third element which is provided between the first element and the first device, wherein the second system includes a second element and: first, outputs the request from the first element to the second element; second, outputs the request from the second element to the third element; and third, outputs the request from the third element to the first device.

BRIEF DESCRIPTION OF THE DRAWINGS

Other features and advantages of the invention will be made more apparent by the following detailed description and the accompanying drawings, wherein.

In the drawings, the same reference numerals represent the same structural elements.

DETAILED DESCRIPTION OF THE PREFERRED EMBODIMENTS

A first embodiment of the present invention will be described in detail below.

Figure 1:
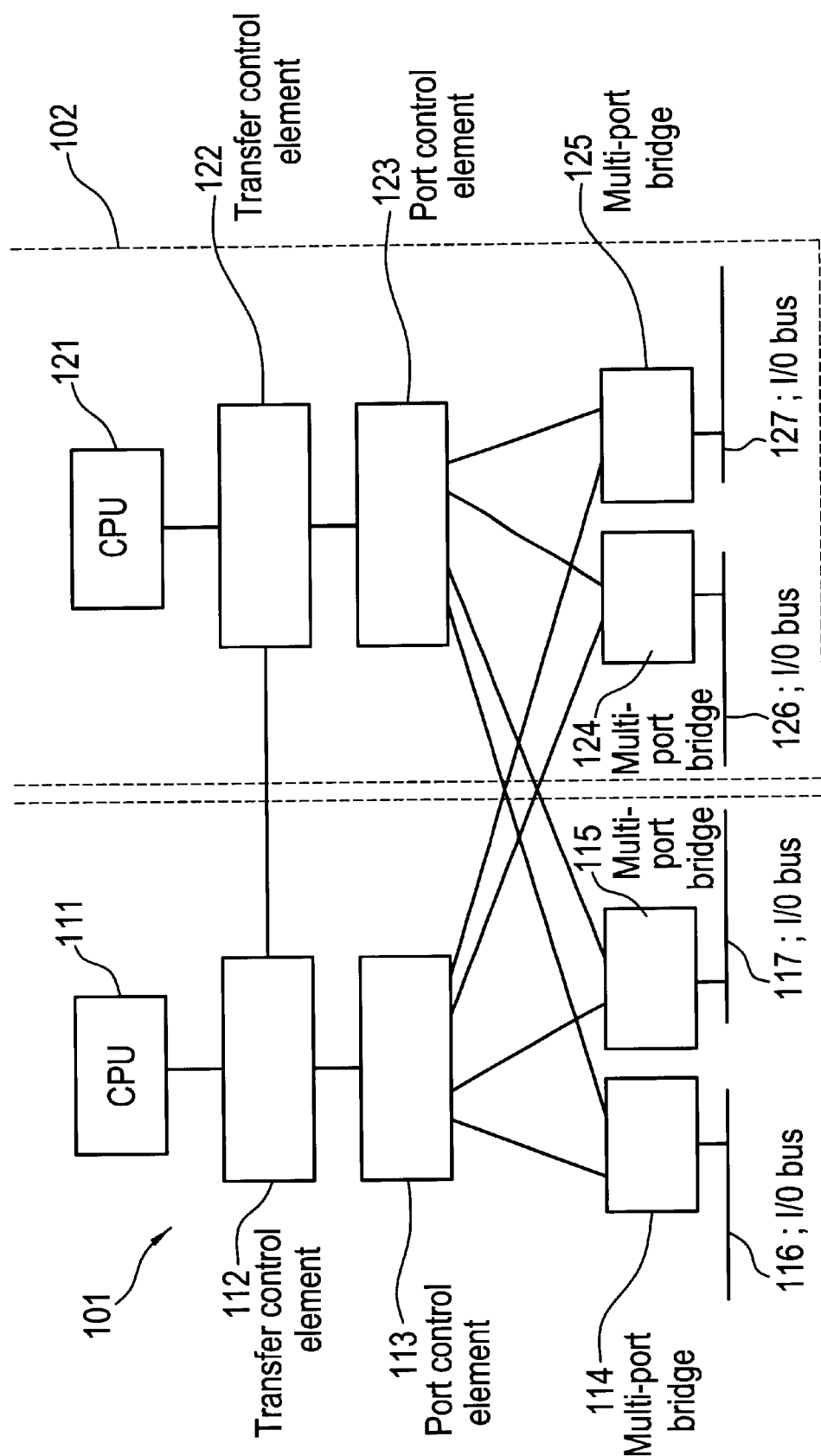
FIG. 1 is a block diagram of the present invention.

Referring to FIG. 1, an alternative path control system includes an element which transfers an I/O transaction and an element which connects to a port of an I/O bus of another system between systems 101 and 102. Systems 101 and 102 have independent I/O buses, respectively, and paths independent of the respective I/O buses. CPUs 111 and 121 of systems 101 and 102 are processors performing information processing independently of each other. The alternative path control system temporarily transfers an access request which is sent from a CPU to an I/O of its own system to another system and then returns the access request to its own system at the entrance of an I/O port. Therefore, if a fault occurs somewhere on a path in its own system, the alternative path control system makes it possible to dynamically create an alternative path to an I/O bus.

More specifically, an alternative path control system includes systems 101 and 102, each having a CPU, 111 and 121, respectively; a transfer control element, 112 and 122, respectively, which selects whether an I/O request outputted from its own system or another system is to be transferred to a path of its own system or to a path of another system based on a specified I/O space address; a port control element, 113 and 123, respectively, which has a plurality of ports to be connected with I/O buses, selects an I/O request transferred from transfer control element 112 and 122 which I/O bus is to be transferred to a port based on an I/O space address, and transfers said I/O request to the selected port of its own system or another system; multi-port bridge elements, 114 and 115 and 124 and 125, respectively, which convert I/O requests transferred from the plurality of ports of port control elements 113 and 123 into transactions for its subordinate I/O buses and transfers them to its subordinate I/O buses; and I/O buses, 116 and 117 and 126 and 127, respectively, which connect interface cards for connecting peripheral devices, respectively.

Transfer control elements 112 and 122 store and manage fault information of ports and alternative path information. If a port placed under its own system fails, transfer control elements 112 and 122 transfer the I/O request to transfer control elements 112 and 122 of another system based on the alternative path information. The request is sent to a port bridge element of its own system through the port control element of another system, and can reach a peripheral device connected with the I/O bus.

Transfer control elements 112 and 122 include a function for adding an own system transfer indication to an I/O request. If a request having an own system transfer indication added has been transferred from the other system, transfer control elements 112 and 122 transfer the request to a path of its own system, i.e. the corresponding port control element, without regard to contents of the I/O request. The own system transfer indication is information to be added to an I/O request in the same manner as an address or data.

Figure 2:
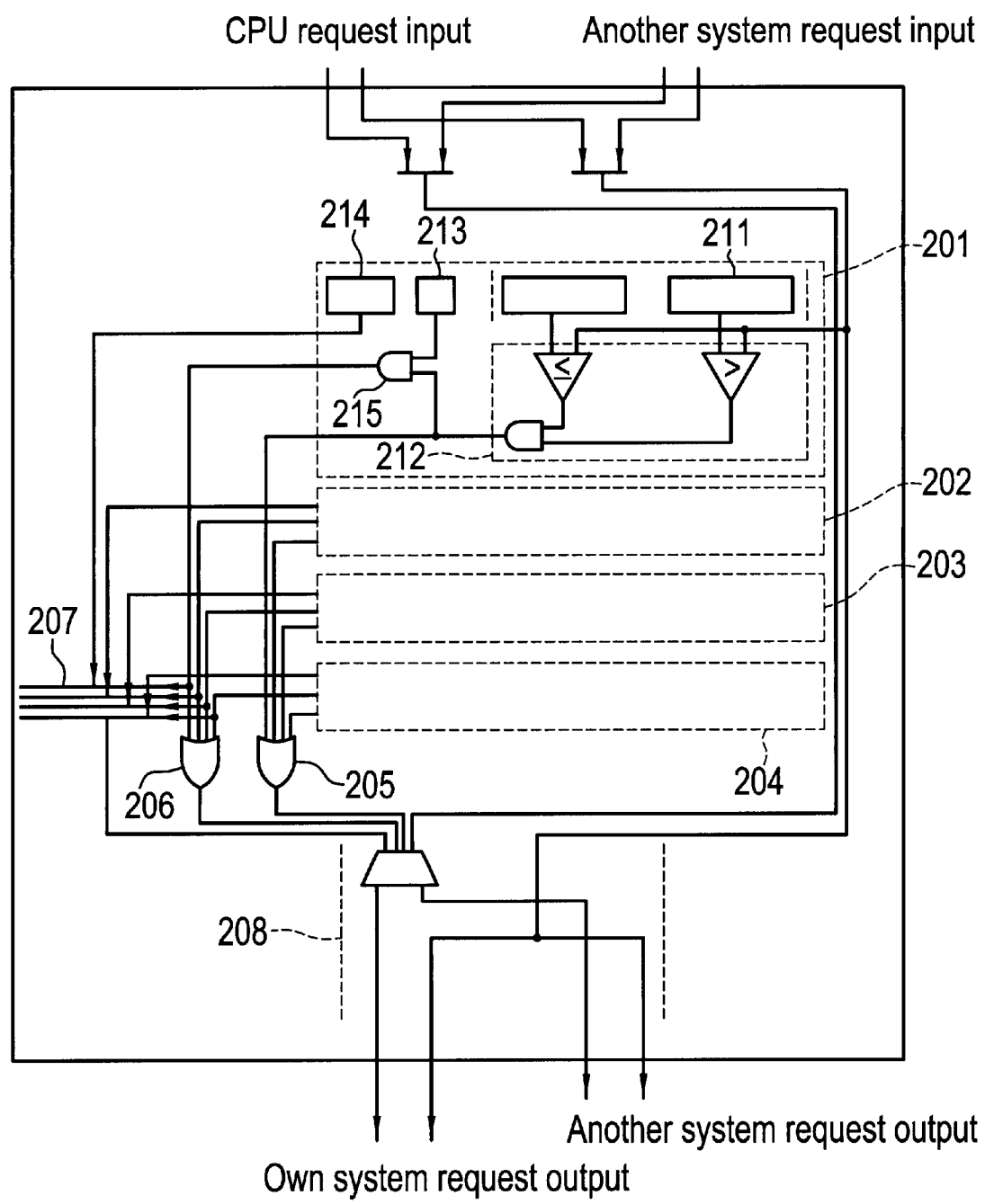
FIG. 2 is a block diagram of a transfer control element of the present invention.

In FIG. 2, transfer control elements 112 and 122 include port selecting elements 201, 202, 203 and 204 each corresponding to the respective ports (four ports) of port control elements 113 or 123 of their own system. Port selecting elements 201, 202, 203 and 204 determine whether a request from CPU 111 or 121 of their own system or the other system is to be transferred to a path of their own system or the other system. Because port selecting elements 201, 202, 203 and 204 have the same composition as one another, only the internal composition of port selecting element 201 is described below and shown in FIG. 2 and the descriptions of port selecting elements 202, 203 and 204 are omitted.

Port selecting element 201 includes a range register 211, a range comparing element 212, a port fault flag 213, an alternative path number register 214, an alternative path indicating element 215, an own-system indicating element 205, an another-system indicating element 206, an alternative path selecting element 207, and a request outputting element 208.

Range register 211 is a register holding the range of the I/O space held by a corresponding port.

Range comparing element 212 determines, by using a window comparator, whether or not the I/O address of an I/O request sent from a CPU is within a range indicated by range register 211, and outputs a coincidence signal if it is within the range.

Port fault flag 213 is a register for holding data indicating that a corresponding port is faulty.

Alternative path number register 214 is a register for holding the number of a system having an alternative path to a corresponding port.

Alternative path indicating element 215 outputs an alternative path indication signal which indicates that an I/O access request to a corresponding port is to be transferred to the other system based on a coincidence indication outputted from range comparing element 212 and a value of the port fault flag 213.

Own-system indicating element 205 calculates the logical sum (OR) of coincidence indications outputted by port selecting elements 201, 202, 203 and 204, and makes its output valid (active) when an I/O request from the CPU or an I/O request outputted from the other system is an access to a port of its own system.

Another-system indicating element 206 calculates the logical sum (OR) of alternative path indication signals outputted by port selecting elements 201, 202, 203 and 204, and indicates that an I/O request outputted from CPU or the other system is to be outputted to the other system having an alternative path.

Alternative path selecting element 207 selects a system to which an I/O request from CPU of its own system or the other system is to be transferred based on a value of the alternative path number register 214 held by port selecting elements 201, 202, 203 or 204, and an alternative path indication signal from alternative path indicating element 215.

Request outputting element 208 determines and outputs whether an I/O request is to be outputted to its own system or the other system, based on the I/O request from the CPU or the other system, an output of own-system indicating element 205, an output of another-system indicating element 206, and an output of alternative path selecting element 207. When a transfer indication to the other system is given from another-system indicating element 206, request outputting element 208 adds an own system transfer indication to the request and transfers it to the other system. When a request from the other system has an own system transfer indication, request outputting element 208 outputs the I/O request to a subordinate of its own system. The own system transfer indication is set when a transfer indication to another system is valid, and in the other cases, an own system transfer indication information is not added to an I/O request even if it is a transfer between transfer control elements.

Figure 3:
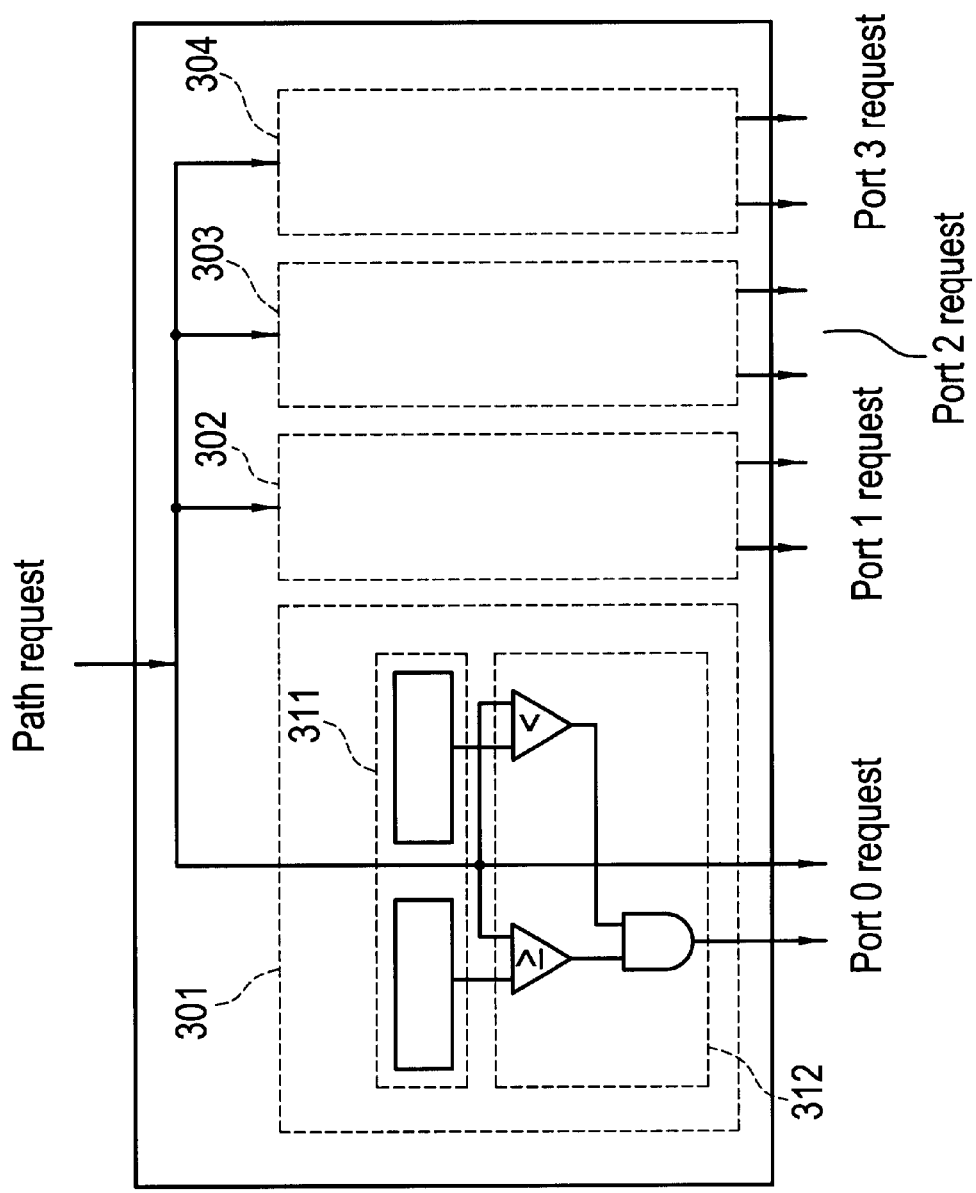
FIG. 3 is a block diagram of a port control element of the present invention.

Referring to FIG. 3, port control elements 113 and 123 include request allocating elements 301, 302, 303 and 304, each of which transfers an I/O request sent from transfer control element 112 or 122 to only one of a plurality of ports based on the I/O address of the I/O request. Because request allocating elements 301, 302, 303 and 304 have the same composition as one another, only an internal composition of request allocating element 301 is described below and shown in FIG. 3.

Request allocating element 301 includes a port range register 311 and a port request control element 312.

Port range register 311 is a register holding the range of an I/O address held by a bus to be connected with a corresponding port.

Port request control element 312 determines, by using a window comparator, whether or not the I/O address of an inputted I/O request is within a range specified by the port range register 311, and transfers the request to a corresponding port when it is within the range.

Next, the embodiment of the present invention will be described more detail in below.

Figure 4:
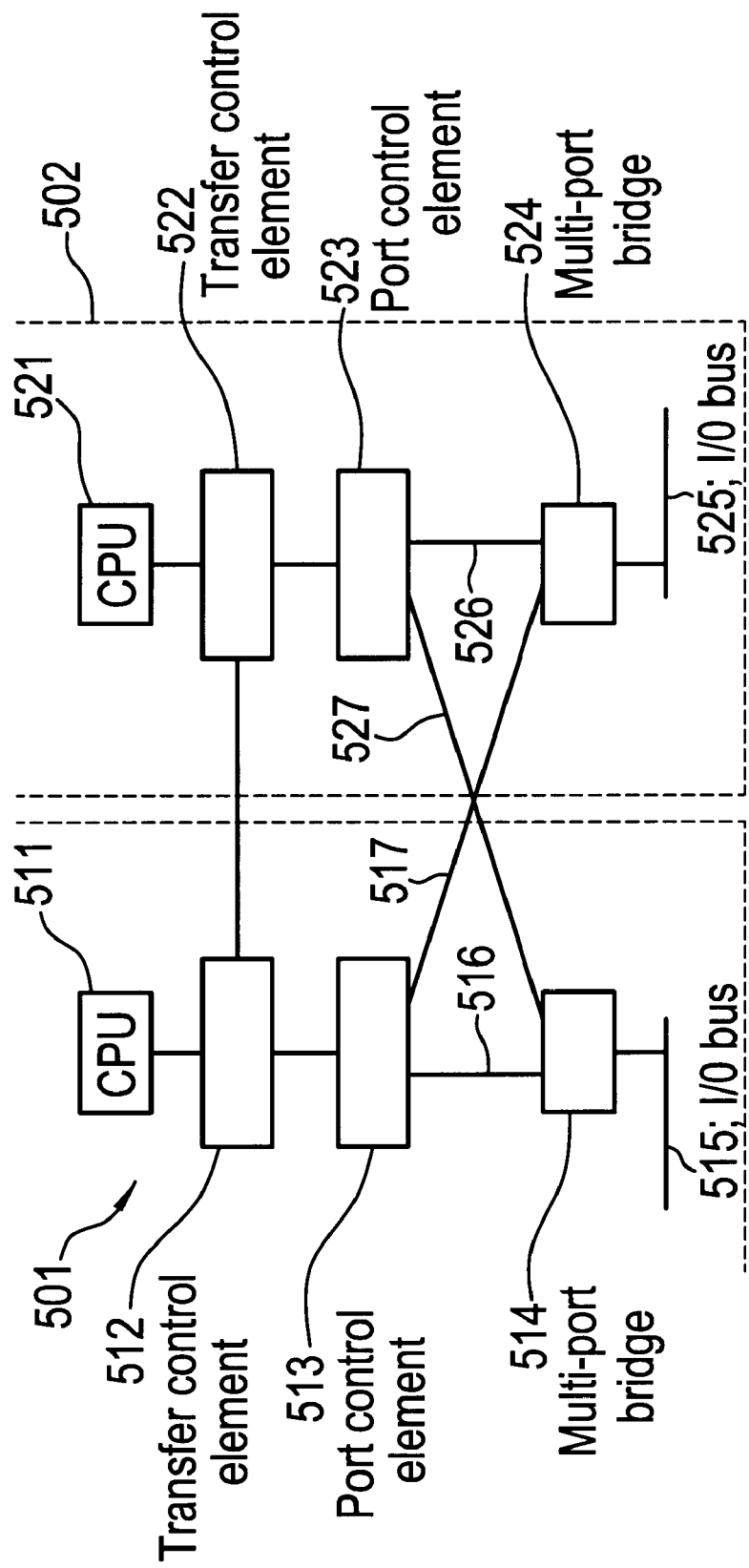
FIG. 4 is a block diagram of the present invention.

Referring to FIG. 4, each of systems 501 and 502 have one I/O bus, and they have paths for connecting the systems with each other between their transfer control elements and between their port control elements and multi-port bridges. Thus, an alternative path control can be dynamically created.

System 501 includes a CPU 511, a transfer control element 512, port control element 513, multi-port bridge 514, and I/O bus 515. System 502 includes a CPU 521, a transfer control element 522, port control element 523, multi-port bridge 524, and I/O bus 525.

CPUs 511 and 521 are processors that process information. Transfer control elements 512 and 522 each select whether an I/O request outputted from CPU 511 or 521, or the other system 502 or 501 is to be transferred to its own system or the other system based on the address of a specified I/O space and outputs the I/O request.

Port control element 513 and 523 each select a port connected to an I/O bus from which an I/O request, which is sent from transfer control element 512 or 522, is to be transferred, based on the I/O address held by said I/O request.

Multi-port bridges 514 and 524 convert I/O requests sent from port control elements 513 and 523 of both systems into transactions of their subordinate buses and transfer them to I/O bus 515 and 525, respectively.

I/O buses 515 and 525 are buses which connect interface cards for connecting peripheral devices.

Port control elements 513 has a port 00 (#0) output 516 and a port 01 (#1) output 517. Port 00 (#0) output 516 is a port for a normal path of an I/O bus 515. Port 01 (#1) output 517 is a port for an alternative path to I/O bus 525. Port control element 523 has a port 11 (#3) output 527 and a port 10 (#2) output 526. Port 11 (#3) output 527 is a port for an alternative path to I/O bus 515. Port 10 (#2) output 526 is a port for a normal path to I/O bus 525.

Figure 5:
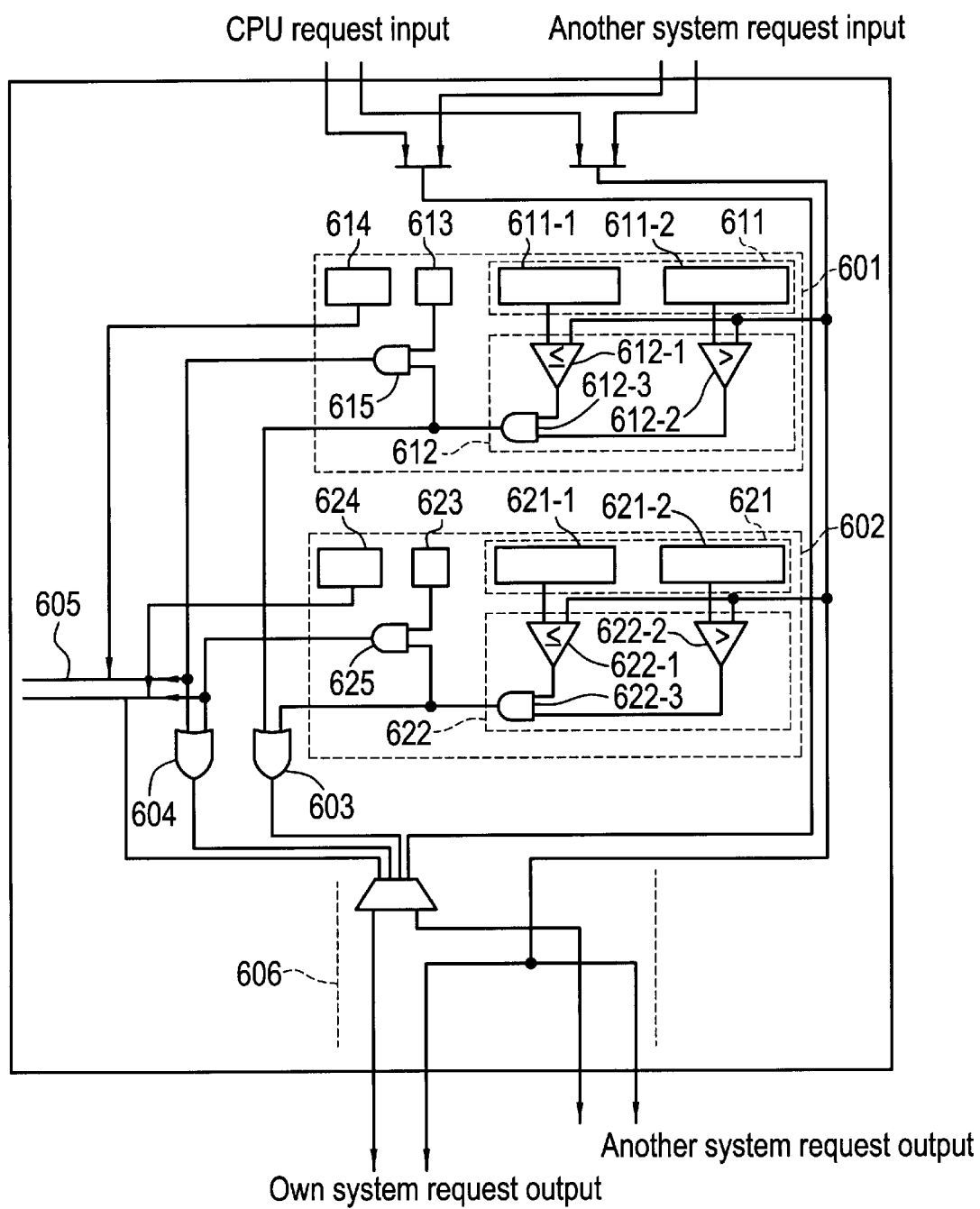
FIG. 5 is a block diagram of a transfer control element of the present invention.

Referring to FIG. 5, port selecting elements 601 and 602 correspond, respectively, to two ports of port control elements 513 and 523 of their own system, and determine whether an I/O request from their own system or the other system is to be transferred to their own system or the other system.

For example, port selecting element 601 of transfer control element 512 corresponds to port 00 output 516 of port control element 513, and port selecting element 602 corresponds to port 01 output 517 of port control element 513. And port selecting element 601 of transfer control element 522 corresponds to port 10 output 526 of port control element 523, and port selecting element 602 corresponds to port 11 output 527 of port control element 513.

Range registers 611 and 621 each are registers holding a range (an address range) of an I/O space of an I/O bus to be connected with a corresponding port.

Range comparing elements 612 and 622 each determine whether or not the I/O address of an I/O request sent from CPU or the other system is within a range indicated by range register 612 or 621, and output a coincidence signal when it is within the range. More specifically, range register 611 has registers 611-1 and 611-2 which have values of the starting point and the end point, respectively. Range comparing element 612 compares the I/O address of an I/O request inputted from CPU or the other system with the value of a register 611-1, and compares the I/O address with the value of a register 611-2 by comparators 612-1 and 612-2 (window comparators). The outputs of comparators 612-1 and 612-2 are inputted into a two-input AND circuit 612-3. When the outputs of comparators 612-1 and 612-2 are both a logical value "1", two-input AND circuit 612-3 outputs a coincidence signal.

Port fault flags 613 and 623 each are registers holding information data indicating that a corresponding port is faulty.

Alternative path number registers 614 and 624 each are registers holding the number of a system having an alternative path to a corresponding port.

Alternative path indicating elements 615 and 625 each calculate the logical OR of a coincidence signal outputted from range comparing element 612 or 622 and a value of the port fault flag 613 or 623, and when a corresponding port is faulty, they each output an alternative path indication signal which indicates that an I/O access request to the corresponding port is to be transferred to the other system instead of their own system.

An own-system indicating element 603 calculates the logical OR of coincidence indications outputted from port selecting elements 601 and 602, and then outputs data indicating that an I/O request inputted from CPU or the other system is an access to a port of its own system.

An another-system indicating element 604 calculates the logical OR of alternative path indication signals outputted from port selecting elements 601 and 602, and then indicates that an I/O request inputted from CPU or the other system is to be outputted to the other system having an alternative path, instead of its own system.

An alternative path selecting element 605 selects a system having an alternative path through which an I/O request inputted from CPU or the other system is to be transferred based on values of alternative path number registers 614 and 624, and alternative path indication signals outputted from alternative path indicating elements 615 and 625.

A request outputting element 606 determines whether an I/O request is to be transferred to its own system or the other system based on the I/O request from CPU or the other system, an output of own-system indicating element 603, an output of another-system indicating element 604, and an output of the alternative path selecting element 605 and outputs the I/O request.

When request outputting element 606 sends a transfer indication to the other system, request outputting element 606 attaches an own system transfer indication to the I/O request and transfers the request to the other system. On the other hand, when an I/O request from the other system has an own system transfer indication, request outputting element 606 outputs the I/O request to a subordinate of its own system without condition.

Figure 6:
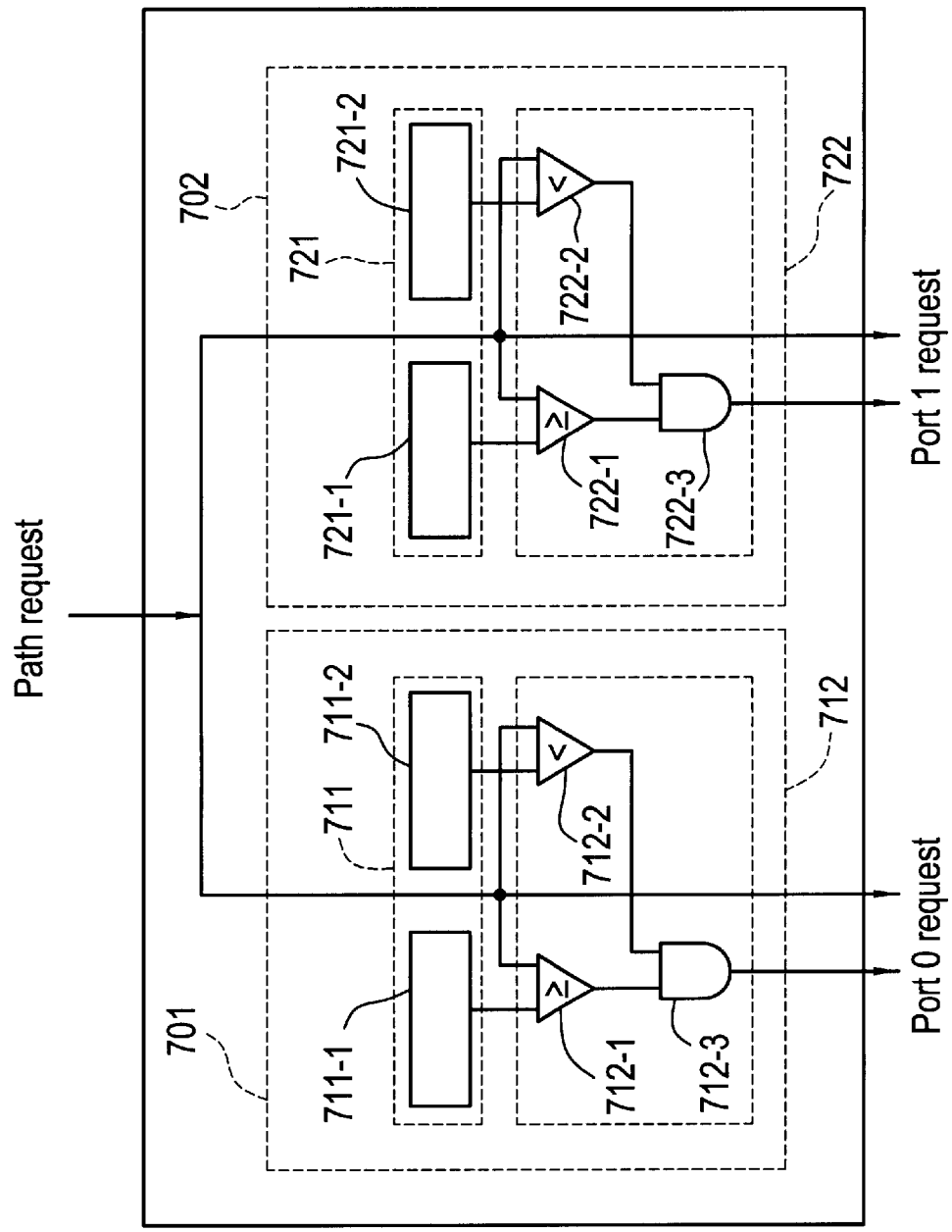
FIG. 6 is a block diagram of a port control element of the present invention.

FIG. 6 shows a detailed composition of port control elements 513 or 523 shown in FIG. 4. Because port control elements 513 and 523 have the same composition as each other, only port control element 513 is described below and shown in FIG. 6.

Referring to FIG. 6, port control element 513 includes request allocating elements 701 and 702, each of which transfers an I/O request sent from transfer control element 512 or 522 to only one port connected with an I/O bus having a corresponding I/O space based on the I/O address of the I/O request.

In this embodiment, port allocating element 701 of port control element 513 corresponds to port 00 output 516, port allocating element 702 of port control element 513 corresponds to the port 01 output 517.

Port range registers 711 and 721 each are registers holding a range of the I/O address of an I/O bus to be connected with a corresponding port.

Port request control elements 712 and 722 each determine whether or not the I/O address of an inputted I/O request is within a range specified by port range register 711 or 721, and transfer the request to a corresponding port when it is within the range. For example, port range register 711 has a register 711-1 which holds values of the starting point and 711-2 which holds values of the end point. Port request control element 712 compares the I/O address of an I/O request with the value of a register 711-1, and compares said I/O address with the value of a register 711-2 by comparators 712-1 and 712-2 (window comparators). The outputs of comparators 712-1 and 712-2 are inputted into a two-input AND circuit 712-3. When the outputs of comparators 712-1 and 712-2 are both a logical value "1", two-input AND circuit 712-3 outputs a coincidence signal.

Because CPUs 511 and 521, multi-port bridges 514 and 524, and I/O buses 515 and 525 shown in FIG. 4 are well-known to persons skilled in the art, a detailed description of their composition is omitted.

Next, the operation of this embodiment will be described.

Referring to FIG. 4, in this embodiment, the address ranges for I/O buses 515 and 525 are "0" to "9" and "10" to "19", respectively. In this case, range registers 611 and 621 shown in FIG. 5, and range registers 711 and 712 shown in FIG. 6 are set, respectively, as shown in FIGS. 7, 8, 9 and 10.

Figure 7:
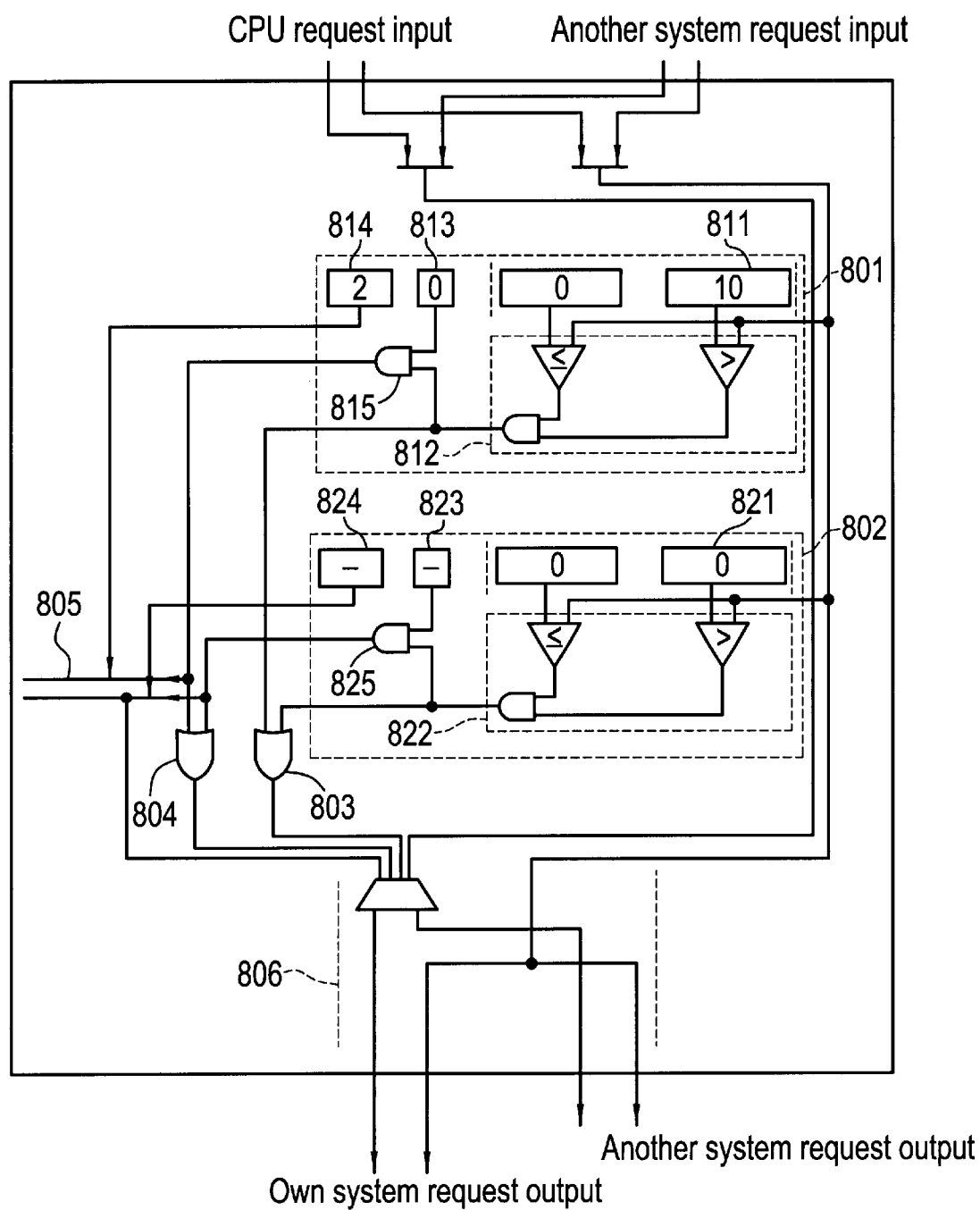
FIG. 7 is a block diagram that explains the operation of the present invention and schematically shows an example of a setting state of transfer control element 512 of FIG. 5.

One possible state of transfer control element 512 is shown in FIG. 7. In a port selecting element 801, because port selecting element 801 corresponds to port 00 output 516 of port control element 513, and because port 00 output 516 is connected to an I/O bus 515, which has I/O addresses "0" to "9", of its own system, values of the starting point and the end point of range register 811 are set to "0" and "10", respectively.

A value ("2") indicating system 502 is set to an alternate path number 814 because any port of system 502 is connected as an alternative path with multi-port bridge 514 to which port 00 output 516 is connected. Assuming that no failure has ocurred on a path of port 00 output 516, a port fault flag 813 is set at a logical value In a port selecting element 802, because port 01 output 517, which corresponds to port selecting element 802, is connected to multi-port bridge 524 of an I/O bus of the other system and works as an alternative path, the starting point and the end point of a range register 821 are both set to "0" to make the corresponding port invalid so that the corresponding port is not used. A port fault flag 823 and an alternative path number 824 are left indefinite and are represented by "–" as shown in FIG. 7 because the corresponding port is an alternative path.

Figure 8:
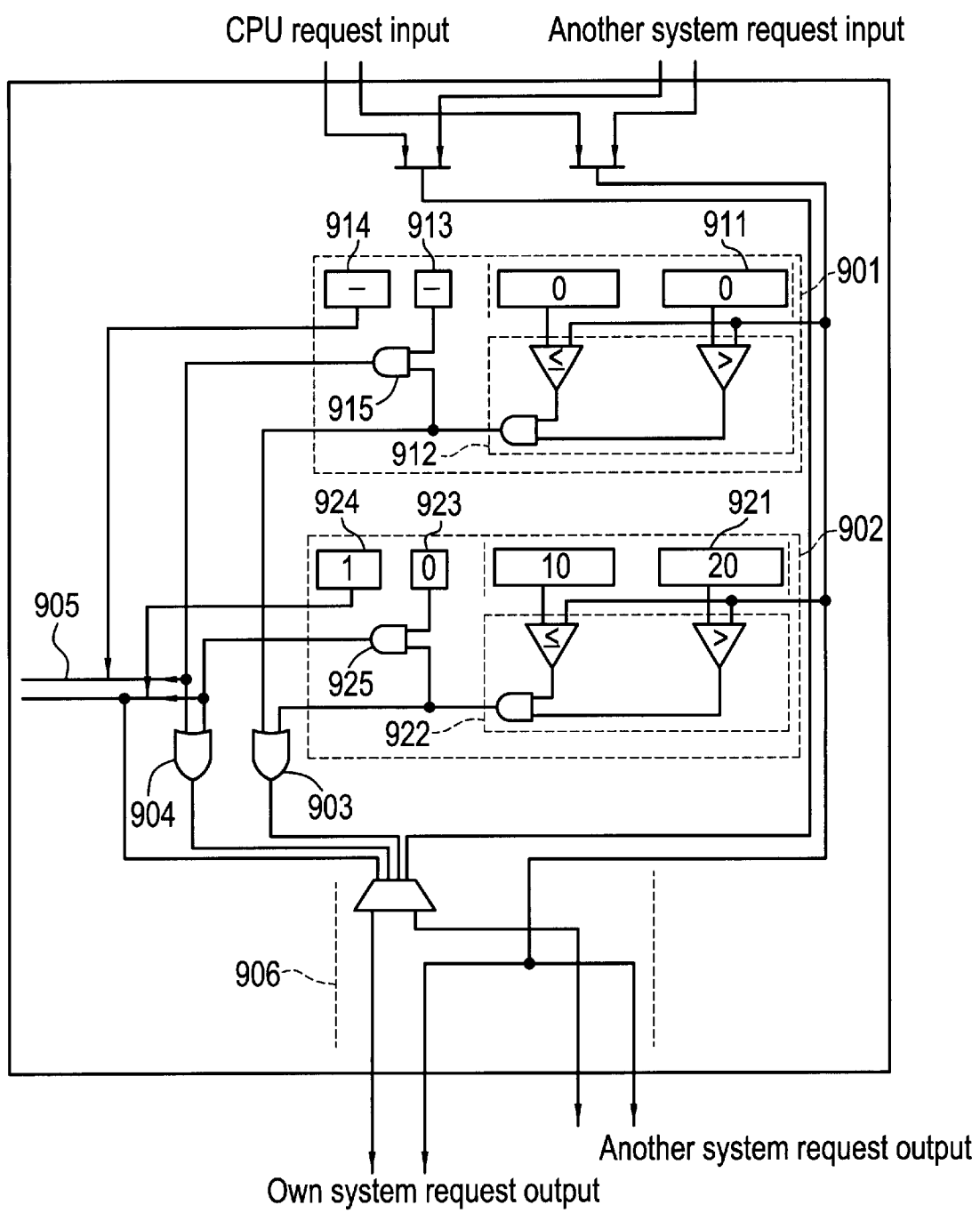
FIG. 8 is a block diagram that explains the operation of the present invention and schematically shows an example of a setting state of transfer control element 522 of FIG. 5.

Similarly, one possible state of transfer control element 522 is shown in FIG. 8. In a port selecting element 902, because port selecting element 902 corresponds to port 10 output 526 of port control element 523, and because port 10 output 526 is connected to an I/O bus 525, which has I/O addresses "10" to "19", of its own system, values of the starting point and the end point of range register 921 are set to "10" and "20", respectively.

A value ("1") indicating system 501 is set to an alternate path number 924 because any port of system 501 is connected as an alternative path with multi-port bridge 524 which is connected to port 10 output 526. Assuming that no failure has ocurred on a path of port 10 output 526, a port fault flag 813 is set at a logical value "0".

In a port selecting element 901, because port 11 output 527, which corresponds to port selecting element 901, is connected to multi-port bridge 514 of an I/O bus of the other system and works as an alternative path, the starting point and the end point of a range register 911 are both set to "0" to make the corresponding port invalid so that the corresponding port is not used. A port fault flag 913 and an alternative path number 914 are left indefinite and are represented by "–" in FIG. 8 because the corresponding port is an alternative path,.

Figure 9:
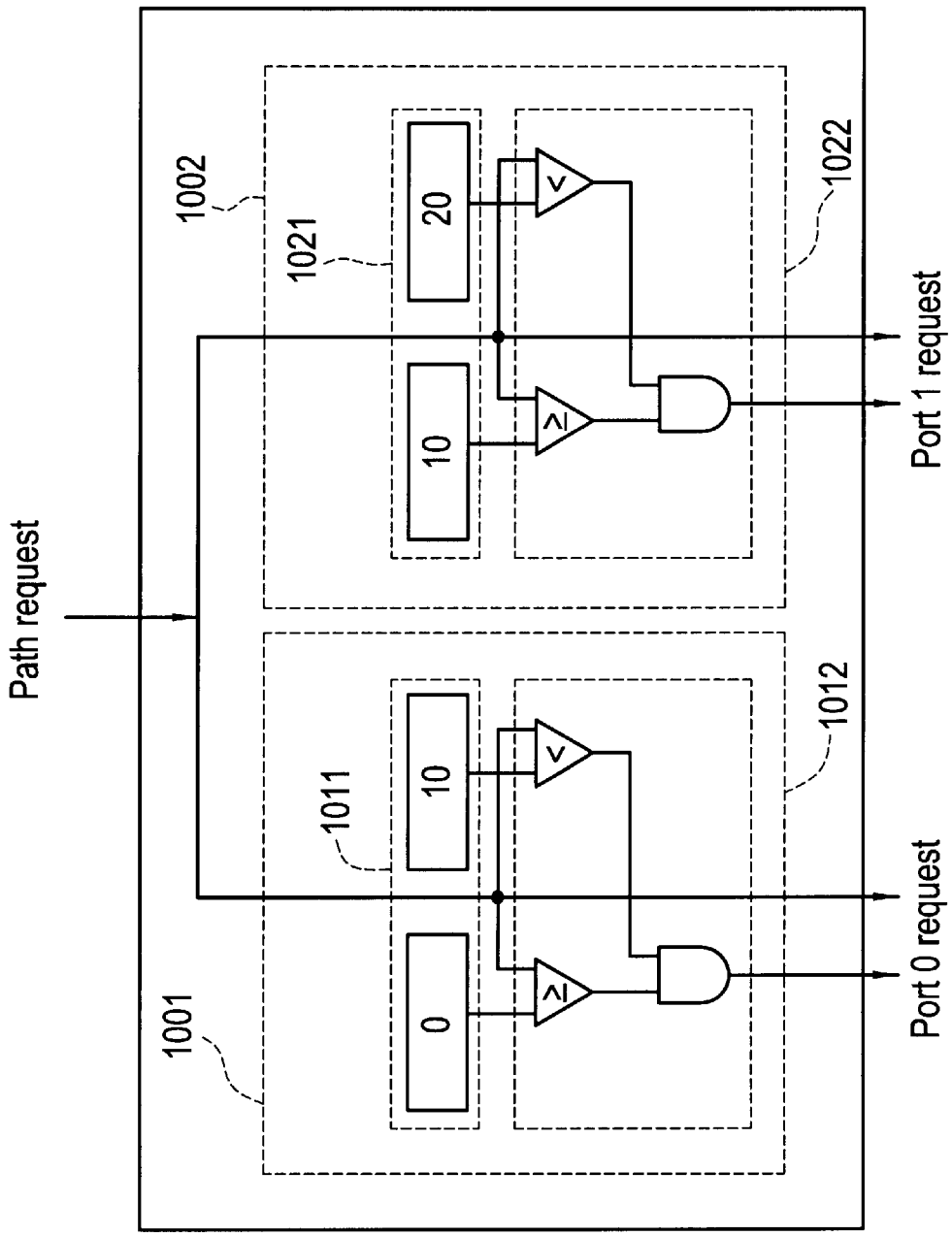
FIG. 9 is a block diagram that explains a operation of the present invention and schematically shows an example of a setting state of port control element 513 of FIG. 5.

One possible state of port control element 513 is shown in FIG. 9. In port control element 513, because port 00 output 516 is connected to multi-port bridge 514 connected to an I/O bus of its own system and port 01 output 517 is connected to multi-port bridge 524 connected to an I/O bus of the other system, the starting point and the end point of a port range register 1011, which correspond to port 00 output 516, are set to "0" and "10", respectively, and the starting point and the end point of a port range register 1021, which correspond to the port 01 output 517, are set to "10" and "20", respectively, to specify the I/O address of an I/O bus to which each port is connected.

Figure 10:
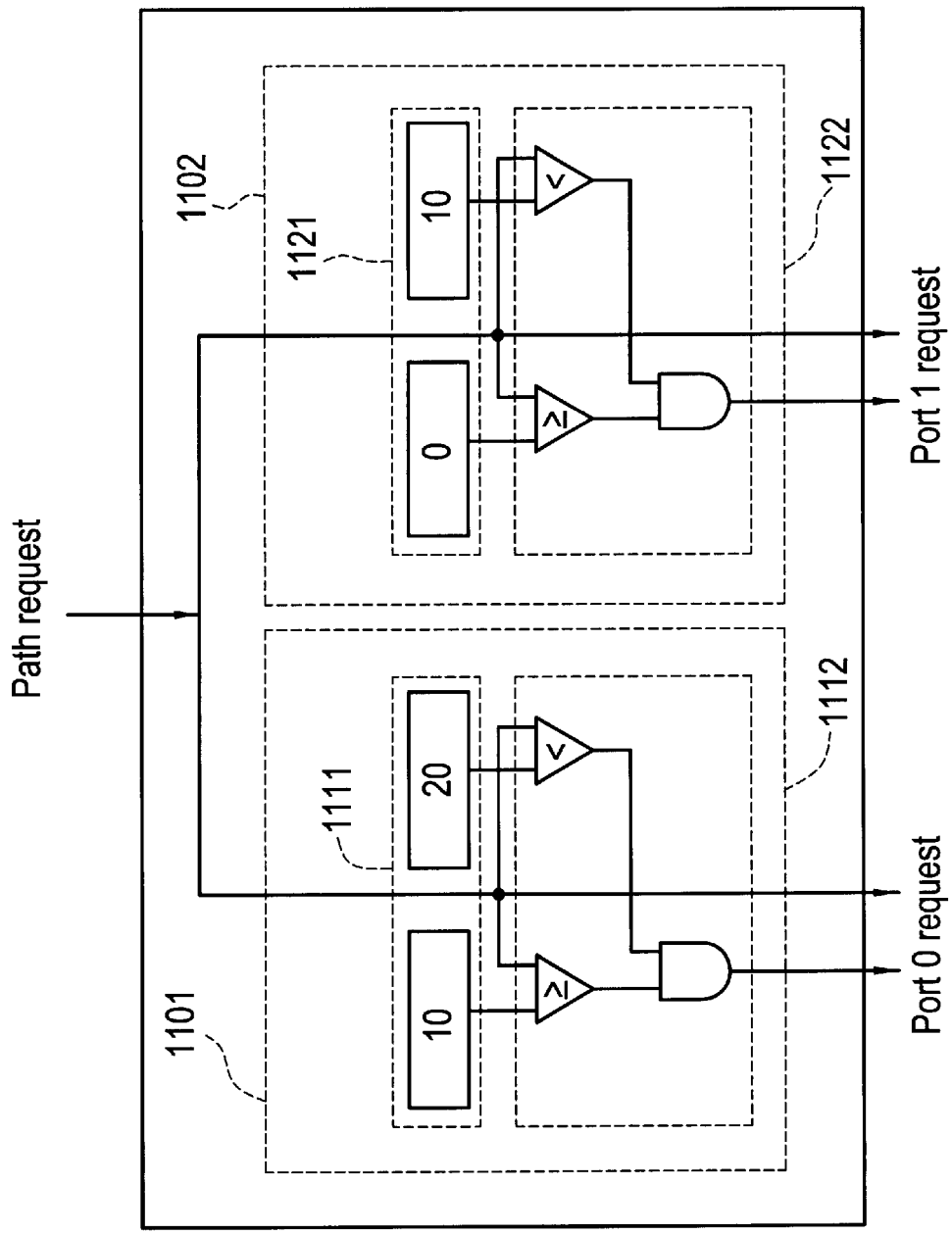
FIG. 10 is a block diagram that explains a operation of the present invention and schematically shows an example of a setting state of port control element 523 of FIG. 5.

One possible state of port control element 523 is shown in FIG. 10. In port control element 523, because port 10 output 526 is connected to multi-port bridge 524 connected to an I/O bus of its own system and port 11 output 527 is connected to multi-port bridge 514 connected to an I/O bus of the other system, the starting point and the end point of a port range register 1111, which correspond to port 10 output 526, are set to "10" and "20", respectively, and the starting point and the end point of a port range register 1121, which correspond to the port 11 output 527, are set to "0" and "10", respectively, to specify the I/O address of an I/O bus to which each port is connected.

Next, the operation of a normal I/O access will be described.

Figure 13:
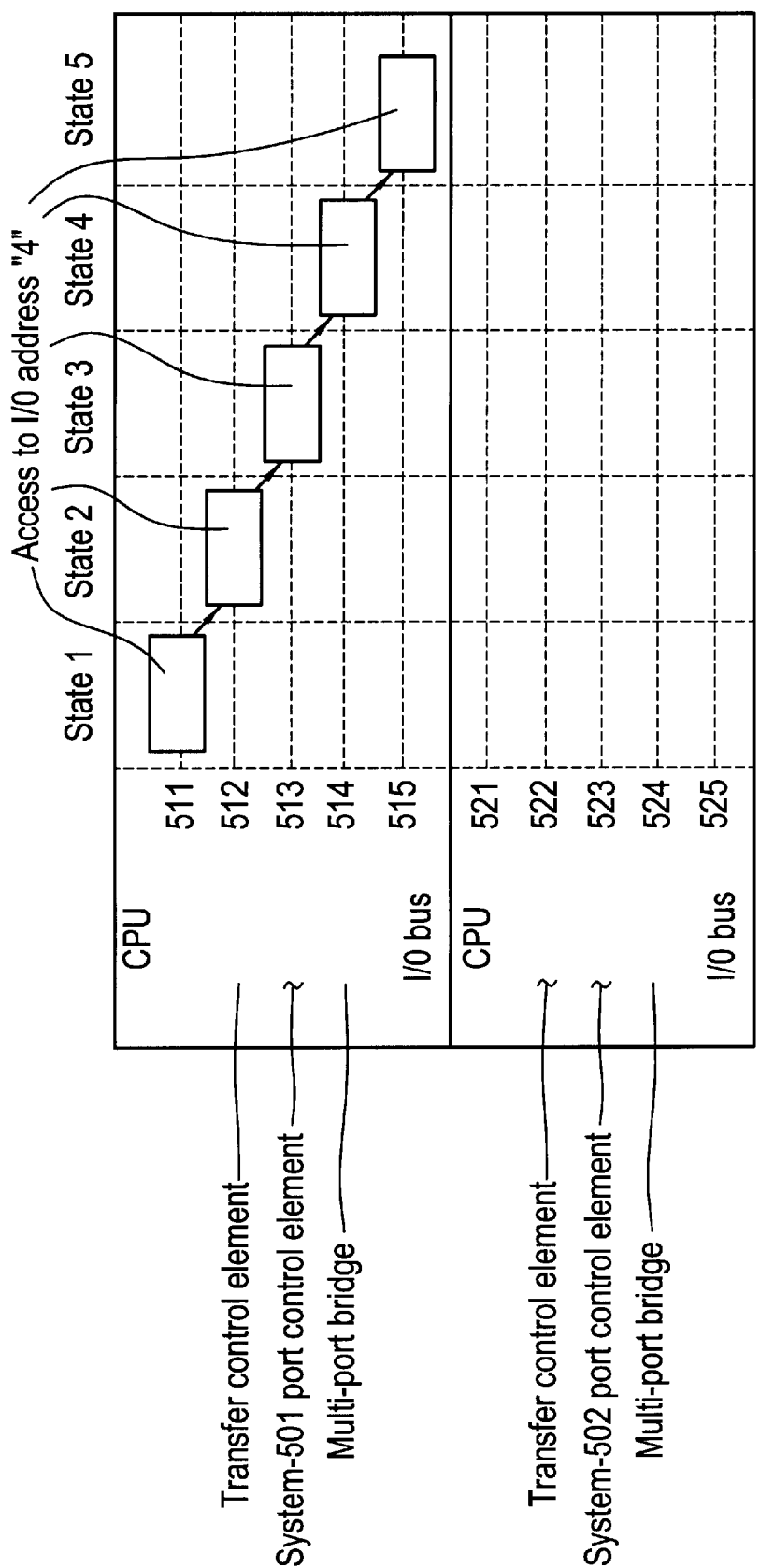
FIG. 13 is a sequence diagram that explains an operation flow during normal operation of the present invention and shows a state transition of an access to an own-system I/O bus from the own-system CPU.

Referring to FIGS. 4 and 13, when CPU 511 outputs an access request (I/O request) to an I/O address "4", the I/O request is transferred to transfer control element 512, which determines whether the I/O request is to be transferred to its own system or the other system (see "state 1" to "state 2" of FIG. 13).

Referring to FIG. 7, in transfer control element 512, when an I/O access is inputted into a CPU request input, port selecting elements 801 and 802 each determine whether or not the access is an access to a port of its own system. Because in port selecting element 801 a range specified by range register 811 has addresses "0" to "9" and the I/O address of the inputted I/O request is "4", range comparing element 812 outputs a coincidence signal. An alternative path indication signal is not outputted, because the port fault flag 813 has a logical value "0".

In port selecting element 802, the starting point and the end point of addresses in a range specified by range register 821 are both "0" and there is no I/O address that satisfies "$0 \leq x < 0$". Therefore, a coincidence signal is not output from port selecting element 802 and an alternative path indication signal does not become valid unless the coincidence signal becomes valid. Thus, port selecting element 802 does not output a coincidence signal or alternative path signal.

Because a coincidence signal of port selecting element 801 is valid, own-system indicating element 803, which calculates the logical OR of coincidence signals of port selecting elements 801 and 802, outputs a "valid" signal.

Another-system indicating element 804, which calculates the logical OR of alternative path indication signals of port selecting elements 801 and 802, outputs an "invalid" signal, because any of the alternative path indication signals of port selecting elements 801 and 802 are invalid.

Own-system indicating element 803 outputs a "valid" signal and another-system indicating element 804 outputs an "invalid" signal. Therefore, request outputting element 806 determines that the I/O request is an access request to a port of its own system and transfers the I/O request to the request output of its own system.

Thus, the I/O request to the I/O address "4" is transferred from transfer control element 512 shown in FIG. 4 to port control element 513 (see "state 3" of FIG. 13).

Next, port control element 513 determines to which port the inputted I/O request is to be transferred and transfers the I/O request. This process is shown in FIG. 9.

In FIG. 9, an I/O request inputted through a path request is inputted into port allocating elements 1001 and 1002 in port control element 513.

In port allocating elements 1001 and 1002, port request control elements 1012 and 1022 determine whether or not the request is an access to their own port based on address ranges held by port range registers 1011 and 1012 and the I/O address of the I/O request and transfer the I/O request. In FIG. 9, port range register 1011 has an address range from "0" to "9" and port range register 1021 has an address range from "10" to "19". Because the I/O address of the inputted I/O request is "4", the I/O request is transferred to a port 0 side which is output from port allocating element 1001.

Thus, an I/O request to the I/O address "4" is transferred from transfer control element 513 to multi-port bridge 514 (see "state 4" of FIG. 13).

Next, multi-port bridge 514 transfers the inputted I/O request to its subordinate bus. Thus, the I/O request to the I/O address "4" from CPU is correctly transferred to I/O bus 515 having an address range from "0" to "9" (see "state 5" of FIG. 13).

Next, the operation when CPU 511 has outputted an access request to an I/O address "14" will be described below.

Figure 14:
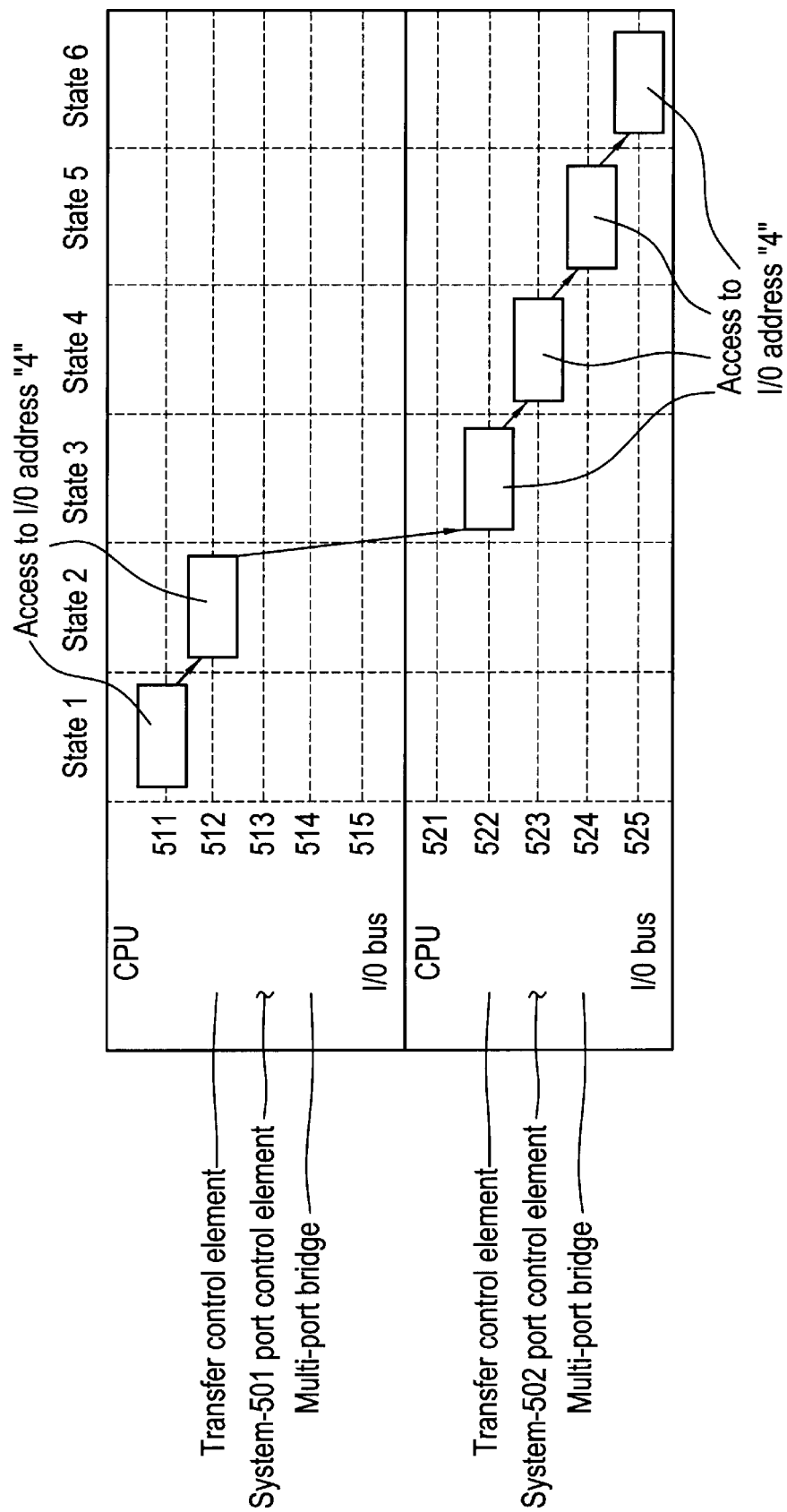
FIG. 14 is a sequence diagram that explains an operation flow during normal operation of the present invention and shows a state transition of an access to an another-system I/O bus from the own-system CPU.

Referring to FIGS. 4 and 7, an access (I/O request) to the I/O address "14" is transferred to transfer control element 512, which determines whether the I/O request is to be transferred to its own system or the other system (see "state 1" to "state 2" of FIG. 14). In transfer control element 512, as shown in FIG. 7, when an I/O access is inputted into a CPU request input, port selecting elements 801 and 802 determine whether or not the I/O request is an access to a port of their own system.

In port selecting element 801, because the I/O address of the inputted I/O request is "14" while a range specified by range register 811 has addresses "0" to "9", range comparing element 812 does not output a coincidence signal. And because port fault flag 813 has a logical value "0", an alternative path indication signal is not outputted.

In port selecting element 802, the starting point and the end point of addresses in a range specified by range register 821 are both "0" and no I/O address satisfies "0≦x<0". Therefore, a coincidence signal is not output from port selecting element 802 and an alternative path indication signal does not become valid unless the coincidence signal becomes valid. Thus, port selecting element 802 does not output a coincidence signal or alternative path signal.

Thus, any output of own-system indicating element 803, which calculates the logical sum (OR) of coincidence signals of port selecting elements 801 and 802, and another-system indicating element 804 which calculates the logical sum (OR) of alternative path indication signals of port selecting elements 801 and 802, becomes invalid.

When request outputting element 806 determines that both outputs of own-system indicating element 803 and another-system indicating element 804 are invalid, request outputting element 806 transfers the I/O request to the another-system request output as an I/O request not to be transferred to an I/O bus of its own system.

Thus, an I/O request to the I/O address "14" is transferred from transfer control element 512 in FIG. 4 to transfer control element 522 (see "state 3" of FIG. 14).

Next, transfer control element 522 determines whether the I/O request is to be transferred to its own system or the other system. FIG. 8 shows the operation of transfer control element 522. When an I/O access is inputted into the other system request input, port selecting elements 901 and 902 determine whether or not the access request is an access to a port of their own system. In port selecting element 902, because a range specified by range register 921 has addresses "10" to "19" and the I/O address of the inputted I/O request is "14", range comparing element 922 outputs a coincidence signal. Because a port fault flag 923 is "0", an alternative path indication signal is not outputted.

On the other hand, in port selecting element 901, the starting point and the end point of addresses in a range specified by range register 911 are both "0" and no I/O address satisfies "0≦x<0". Therefore, a coincidence signal is not output from port selecting element 901 and an alternative path indication signal does not become valid unless the coincidence signal becomes valid. Thus, port selecting element 901 does not output a coincidence signal or alternative path signal.

Next, own-system indicating element 903, which calculates the logical OR of coincidence signals of port selecting elements 901 and 902, outputs a "valid" signal, because a coincidence signal of port selecting element 902 is valid. Another-system indicating element 904, which calculates the logical OR of alternative path indication signals of port selecting elements 901 and 902, outputs an "invalid" signal, if any of the alternative path indication signals of port selecting elements 901 and 902 are invalid.

Because own-system indicating element 903 outputs a "valid" signal and another-system indicating element 904 specifies an "invalid" signal, request outputting element 906 determines that the access request is an access to a port of its own system and transfers the I/O request to the own system request output.

Thus, an I/O request to the I/O address "14" results in being transferred from transfer control element 522 in FIG. 4 to port control element 523 (see "state 4" of FIG. 14).

Next, port control element 523 determines to which port an inputted I/O request is to be transferred and transfers the I/O request. This process is shown in FIG. 10.

Referring to FIG. 10, a request inputted through a path request is inputted into port allocating elements 1101 and 1102 of port control element 523. In port allocating elements 1101 and 1102, port request control elements 1112 and 1122 determine whether or not the request is an access to their own port based on address ranges held by port registers 1111 and 1112 and the I/O address of the I/O request. Port allocating elements 1101 and 1102 transfer the request. In FIG. 10, the port range register 1111 has an address range from "10" to "19" and the port range register 1121 has an address range from "0" to "9". Because the I/O address of the inputted I/O request is "14", the I/O request is transferred to a port 0 side which is an output of port allocating element 1101.

Thus, an I/O request to the I/O address "14" results in being transferred from port control element 523 in FIG. 4 to multi-port bridge 524 (see "state 5" of FIG. 14).

Next, multi-port bridge 524 transfers the inputted I/O request to its subordinate bus. Thus, the I/O request to the I/O address "14" from CPU 511 is correctly transferred to an I/O bus 525 having an address range from "10" to "19" (see "state 6" of FIG. 14).

Because the systems are symmetrical in structure to each other, a request from CPU 521 to the I/O bus 515 or 525 operates in the same way.

Next, the operation when a failure has occurred in a port control element will be described.

Figure 11:
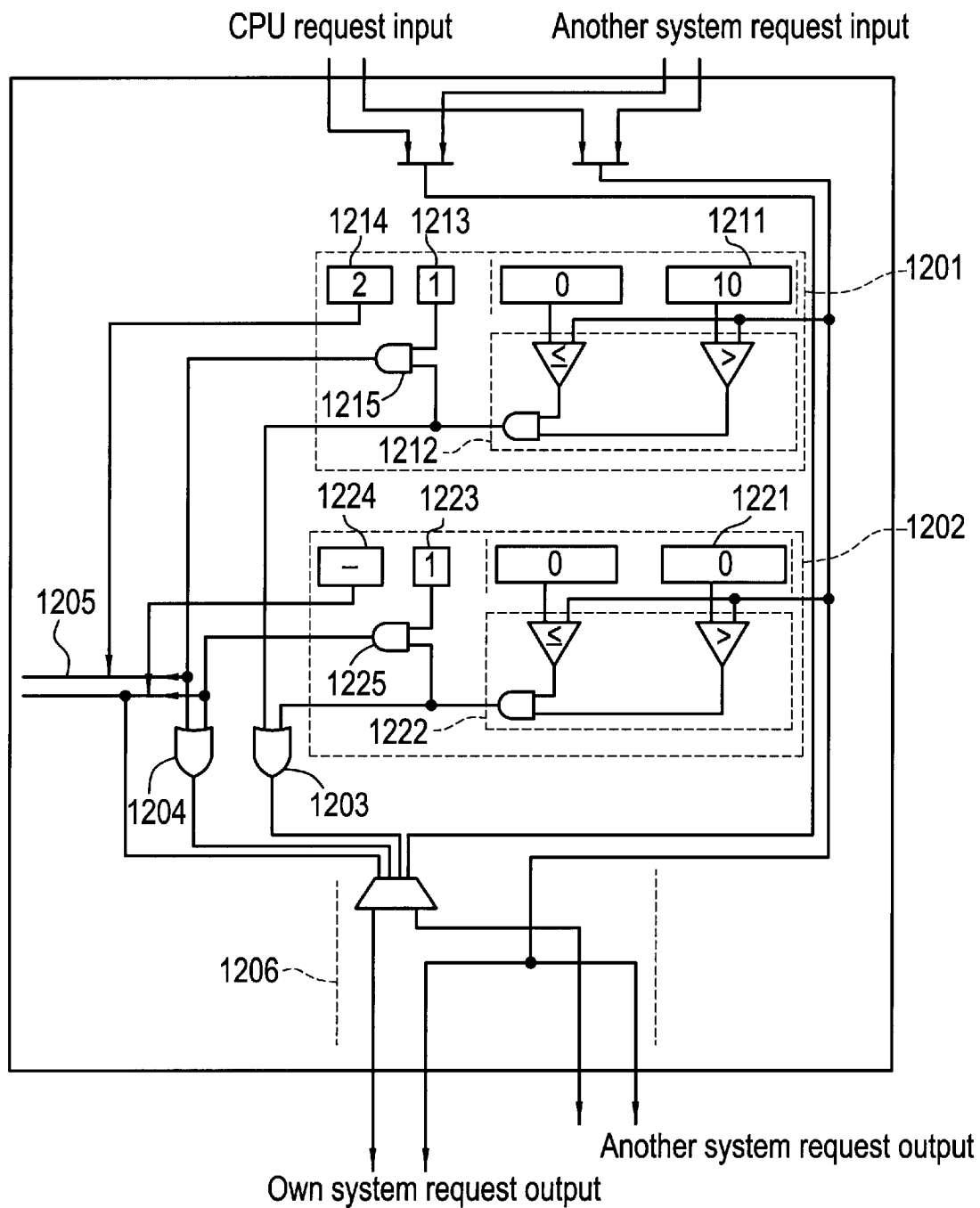
FIG. 11 is a block diagram that explains a operation of the present invention and schematically shows an example of a setting state of transfer control element 512 when a failure has occurred in port control element 512 of FIG. 5.

In this case, port 00 output 516 and port 01 output 517 placed under port control element 513 cannot be used when a failure has occurred in port control element 513. Therefore, values of the port fault flags 813 and 823 of transfer control element 512, which transfers an I/O request to port control element 513, are set at a logical value "1". FIG. 11 shows a state of transfer control element 512 at this time.

The operation when CPU 511 outputs an I/O request to the I/O address "4" will be described.

Figure 15:
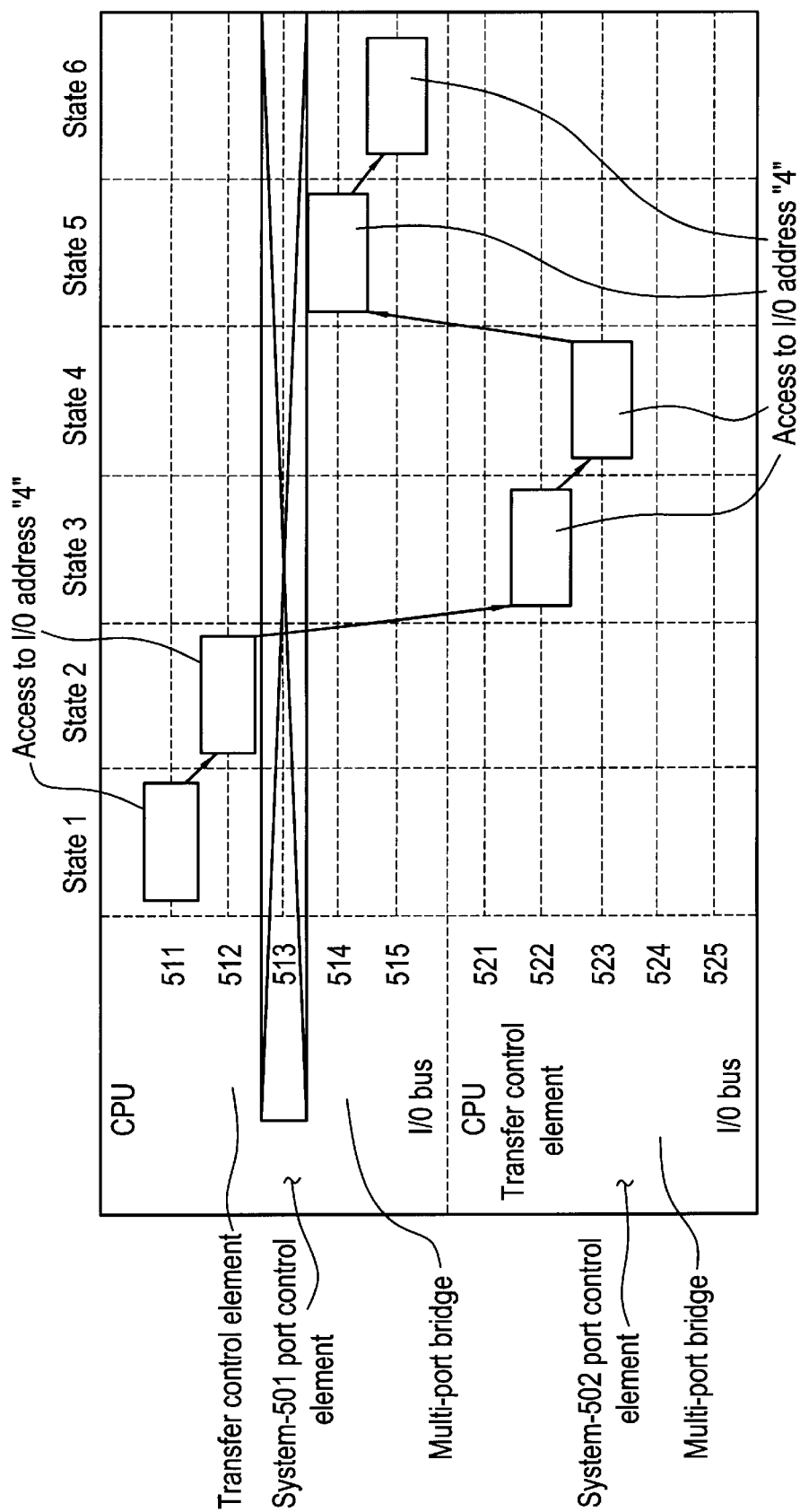
FIG. 15 is a sequence diagram that explains an operation flow of the present invention when a failure has occurred and shows a state transition of an access to an own-system I/O bus from the own-system CPU.

Referring to FIGS. 4 and 11, when CPU 511 outputs an access (I/O request) to the I/O address "4", the I/O request is transferred to transfer control element 512, which determines whether the request is to be transferred to its own system or the other system (see "state 1" to "state 2" of FIG. 15). When an I/O request is inputted into CPU request input, port selecting elements 1201 and 1202 determine whether or not the request is an access to a port of their own system.

In port selecting element 1201, because a range specified by range register 1211 has addresses "0" to "9" and the I/O address of the inputted I/O request is "4", range comparing element 1212 outputs a coincidence signal. An alternative path indication signal becomes valid because a port fault flag 1213 is "1" at this time.

In port selecting element 1202, the starting point and the end point of addresses in a range specified by range register 1221 are both "0" and no I/O address satisfies "0≦x<0". Therefore, a coincidence signal is not output from port selecting element 1202 and an alternative path indication signal does not become valid unless the coincidence signal becomes valid. Thus, port selecting element 1202 does not output a coincidence signal or alternative path signal.

Own-system indicating element 1203, which calculates the logical OR of coincidence signals of port selecting elements 1201 and 1202, outputs a "valid" signal because a coincidence signal of port selecting element 1201 is valid. Another-system indicating element 124, which calculates the logical OR of alternative path indication signals of port selecting elements 1201 and 1202 also outputs a "valid" signal because an alternative path indication signal of port selecting element 1201 is valid.

Because another-system indicating element 1204 outputs a "valid" signal, request outputting element 1206 determines that the request is an access to the other system without regard to own-system indicating element 1203 and transfers the request to the other system. At this time, an output of the alternative path selecting element 1205 is used as an alternative path number in order to determine to which system the request is to be transferred.

Alternative path selecting element 1205 selects and outputs the alternative path number held by the port selecting element which has outputted an alternative path indication signal. Specifically, alternative path selecting element 1205 inputs alternative path numbers 1214 and 1224, and selects the alternative path number of alternative path indicating element 1215 or 1225 which outputs a logical value "1". In this case, a value ("2") of alternative path number 1214 which indicates system 502 and is held by port selecting element 1201 which has outputted an alternative path indication signal, is outputted.

Request outputting element 1206 transfers the inputted request to system 502 based on the indication of alternative path selecting part 1205.

Thus, an I/O request to the I/O address "4" is transferred from transfer control element 512 in FIG. 4 to transfer control element 522. At this time, the request to which an own system transfer indication has been added is transferred (see "state 3" of FIG. 15).

In transfer control element 522, when receiving an I/O request to which an own system transfer indication has been added, transfer control element 522 transfers the I/O request to the own system request output without condition.

Thus, an I/O request to the I/O address "4" is transferred from transfer control element 522 in FIG. 4 to port control element 523 (see "state 4" of FIG. 15).

Next, port control element 523 determines to which port the inputted I/O request is to be transferred and transfers the I/O request. This process is shown in FIG. 10.

An I/O request inputted through a path request is inputted into port allocating elements 1101 and 1102 of port control element 523. In port allocating elements 1101 and 1102, port request control elements 1112 and 1122 determine whether or not the request is an access to their own port based on address ranges held by port registers 1111 and 1121 and the I/O address of the I/O request, and transfer the I/O request. In FIG. 10, port range register 1111 has an address range from "10" to "19" and port range register 1121 has an address range from "0" to "9". Because the I/O address of the inputted I/O request is "4", the I/O request is transferred to a port 1 side which is output of port allocating element 1102.

Thus, an I/O request to the I/O address "4" results in being transferred from port control element 523 in FIG. 4 to multi-port bridge 514 (see "state 5" of FIG. 15).

Multi-port bridge 514 transfers the inputted I/O request to its subordinate bus and thus the I/O request to I/O address "4" from CPU is transferred to an I/O bus 515 having an address range from "0" to "9" (see "state 6" of FIG. 15).

In this way, an access to I/O address "4" does not pass through port control element 513 in which a failure has occurred, but is transferred in such a way that "CPU 511", "Transfer control element 512", "Transfer control element 522", "Port control element 523", "Multi-port bridge 514", "I/O bus 515", form an alternative path to a normal path that "CPU 511", "Transfer control element 512", "Port control element 513", "Multi-port bridge 514", "I/O bus 515" formed.

Next, the operation when CPU 521 accesses I/O address "4" will be described.

Figure 16:
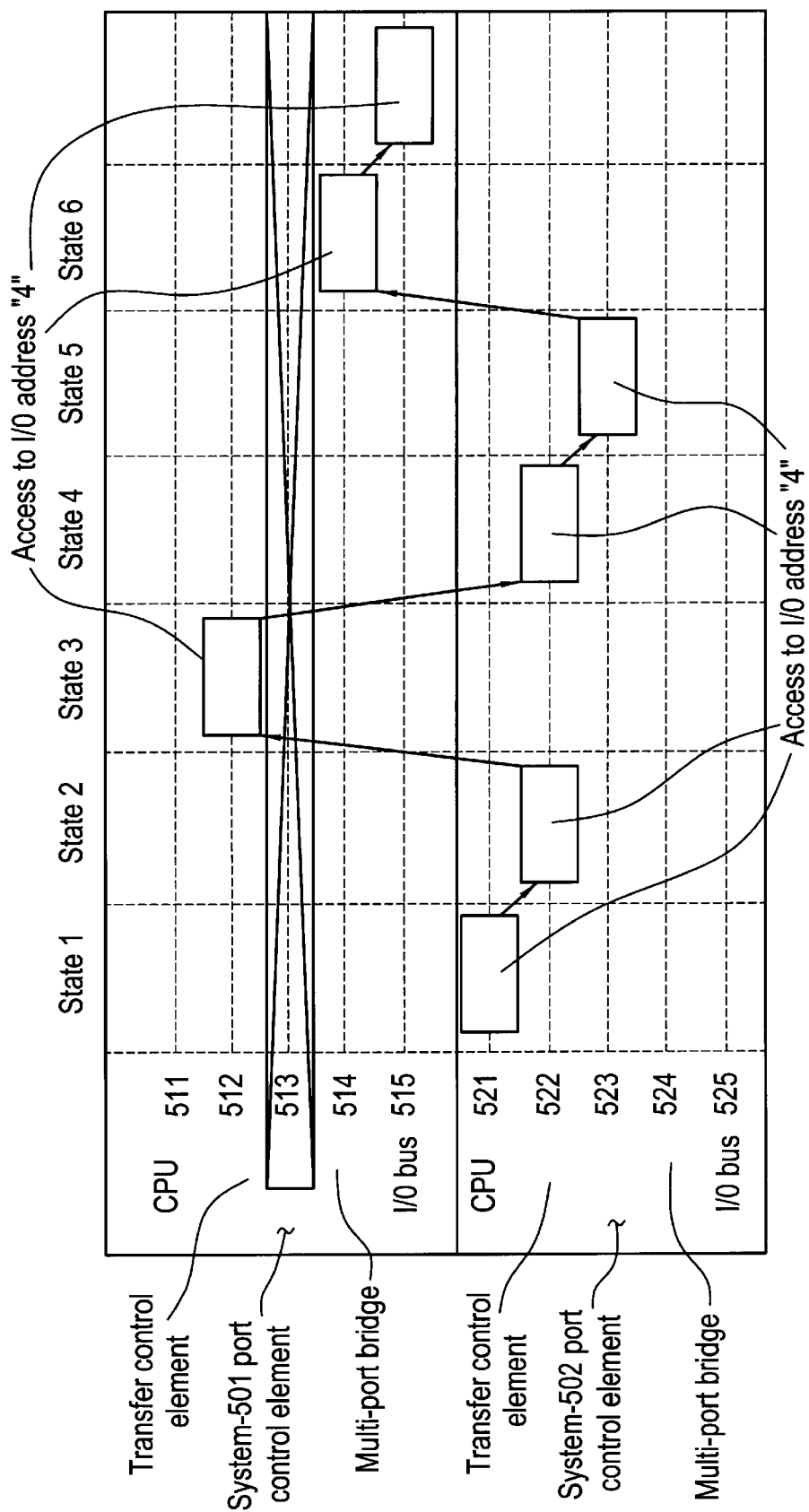
FIG. 16 is a sequence diagram that explains an operation flow of the present invention when a failure has occurred and shows a state transition of an access to an another-system I/O bus from the own-system CPU.
Figure 17:
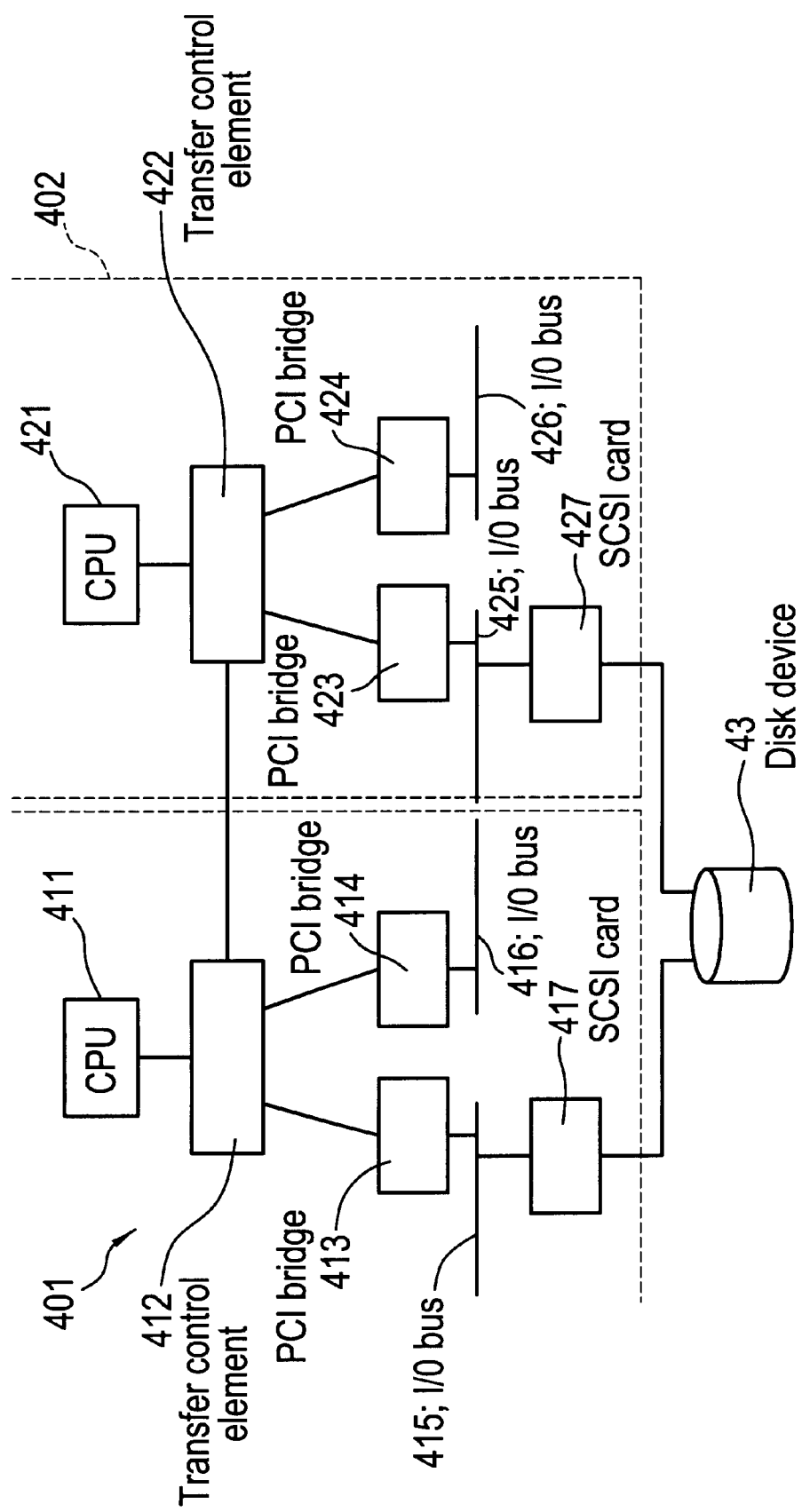
FIG. 17 is a block diagram of a conventional alternative path control system.

When CPU 521 outputs an access request (I/O request) to I/O address "4", the request is transferred to transfer control element 522, which determines whether the request is to be transferred to its own system or the other system (see "state 1" to "state 2" of FIG. 16). As shown in FIG. 8, when an I/O request is inputted into CPU request input, port selecting elements 901 and 902 determine whether or not the I/O request is an access to a port of their own system. In port selecting element 902, while a range specified by range register 921 has addresses "10" to "19", the I/O address of the inputted I/O request is "4", therefore, range comparing element 922 does not output a coincidence signal. Because the port fault flag 923 has a logical value "0", an alternative path indication signal is not outputted.

In port selecting element 901, the starting point and the end point of addresses in a range specified by range register 911 are both "0" and no I/O address satisfies "$0 \leq x < 0$". Therefore, a coincidence signal is not output from port selecting element 901 and an alternative path indication signal does not become valid unless the coincidence signal becomes valid. Thus, port selecting element 901 does not output a coincidence signal or alternative path signal.

Thus, the output of any of own-system indicating element 903, which calculates the logical sum (OR) of coincidence signals of port selecting elements 901 and 902, and another-system indicating element 904, which calculates the logical sum (OR) of alternative path indication signals of port selecting elements 901 and 902, becomes invalid.

Request outputting element 906 determines that the outputs of both of own-system indicating element 903 and another-system indicating element 904 are invalid, and transfers the I/O request to the other system request output as a result of determining that this request is not an access directed to an I/O bus of its own system.

Thus, an I/O request to the I/O address "4" results in being transferred from transfer control element 522 in FIG. 4 to transfer control element 512 (see "state 3" of FIG. 16).

When receiving the request from transfer control element 522, transfer control element 512 determines whether or not said request has an own system transfer indication. In this case, because the request has no own system transfer indication, transfer control element 512 handles the request from the other system in an equivalent manner to a request sent from CPU 511 of its own system.

Therefore, a process after this becomes an equivalent operation when an access to I/O access "4" comes from CPU 511 (equivalent to "state 2" of FIG. 15). As a result, the request is transferred along a route that includes "CPU 521", "Transfer control element 522", "Transfer control element 512", "Transfer control element 522", "Port control element 523", "Multi-port bridge 514", and "I/O bus 515" (see "state 1" to "state 7" of FIG. 16), which is an alternative path for a normal path that includes "CPU 521", "Transfer control element 522", "Transfer control element 512", "Port control element 513", "Multi-port bridge 514", and "I/O bus 515".

Next, a second embodiment of the present invention will be described in detail. A novel feature of the second embodiment is the configuration of the port control element. The other portions of the system are the same as those in the first embodiment.

Figure 12:
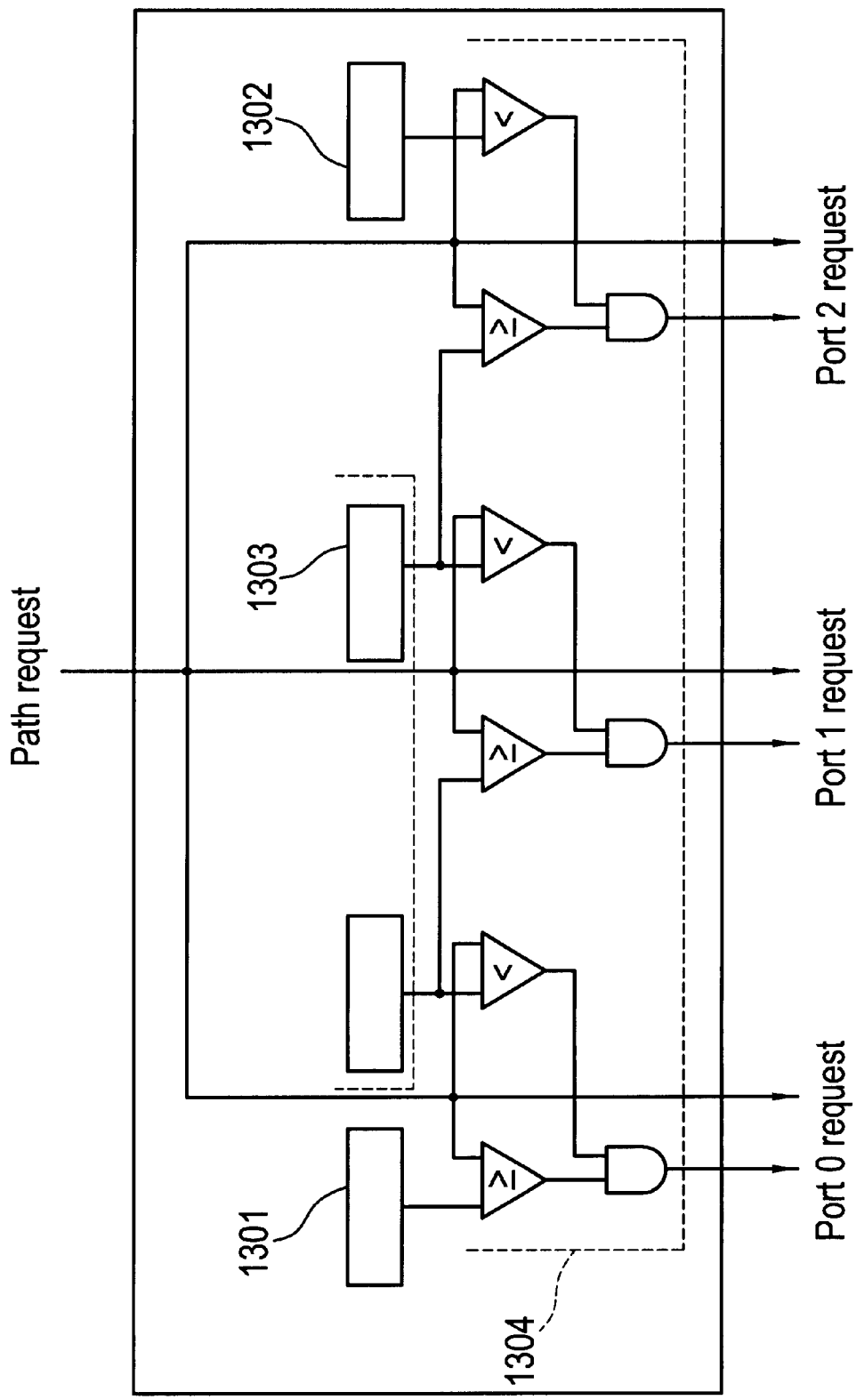
FIG. 12 is a block diagram of a port control element in a second embodiment of the present invention.

FIG. 12 shows the composition of a port control element of the second embodiment. In this port control element, a port range register shares a register containing the starting point address of each port and a register containing the end point address of each port.

In FIG. 12, the port control element includes a starting point register 1301, an end point register 1302, a port starting and end point register 1303, and port request control element 1304. Starting point register 1301 holds the starting point of an address of a subordinate of port control element as its value. End point register 1302 holds the end point of an address of a subordinate of port control element as its value. A port starting and end point register 1303 stores a break between the addresses of ports held by the port control element. Port request control element 1304 determines whether or not the I/O address of a request is between the starting point register 1301 and the starting and end point register 1303, or between the starting and end point register 1303, or between the starting and end point register 1303 and the end point register 1302, and outputs the I/O request to a corresponding port when the I/O address is contained.

In this embodiment, because a register storing both the starting point and end point between the respective ports of the port control element is provided in the port control element, the number of registers can be reduced.

While this invention has been described in conjunction with the preferred embodiments described above, it will now be possible for those skilled in the art to put this invention into practice in various other manners.

What is claimed is:

1. An information processing system comprising:
   a first system, in which a first device is provided, that produces a request for said first device, wherein said first system includes a first element which is connected to said first device and has at least two inputs, a second element which receives said request and outputs said request to one of said inputs of said first element, and a third element which outputs said request to said second element; and
   a second system, in which a second device is provided, that has a fourth element which is connected to said second device and has at least two inputs, a fifth element which receives said request and outputs said request to one of said inputs of said fourth element, and a sixth element which outputs said request to said fifth element;
   wherein said third element outputs said request to said sixth element when there is a failure on the path from said third element to said first element; and
   wherein said fifth element outputs said request to one of said inputs of said first element.

2. The information processing system as claimed in claim 1, wherein said third element determines whether said request is to be sent in said first system or to said second system based on an address of said request and whether or not there is a failure on the path from said third element to said first element.

3. The information processing system as claimed in claim 1, wherein said third element includes a first register which stores information indicating said second system as an alternative path.

4. The information processing system as claimed in claim 1, wherein said third element includes a second register which stores information indicating that there is a failure on the path from said third element to said first element.

5. The information processing system as claimed in claim 1, wherein said fifth element determines whether said request is to be sent to said first element or to said fourth element based on an address of said request.

6. The information processing system as claimed in claim 1, wherein said third element includes an element which adds information to said request,
   wherein said information designates said sixth element to unconditionally transfer said request to said fifth element.

7. An information processing system comprising:
   a first system, connected to a first device, and which produces a request for said first device;
   a second system which is independent from said first system;
   a first element, which is provided in said first system, that sends said request to said second system;
   a second element, which is provided in said second system, that receives said request from said first element and outputs said request to said first system; and
   a third element, which is provided in said first system, that receives said request from said second element and outputs said request to said first device.

8. The information processing system as claimed in claim 7, wherein said first element outputs said request to said second system when there is a failure on the path from said first element to said third element.

9. The information processing system as claimed in claim 7, wherein said first element outputs said request to said third element when there is not a failure on the path from said first element to said third element.

10. The information processing system as claimed in claim 7, wherein said first element determines whether said request is to be sent in said first system or to said second system based on an address of said request and whether or not there is a failure on the path from said first element to said third element.

11. The information processing system as claimed in claim 7, wherein said first element includes a first register which stores information indicating said second system as an alternative path.

12. The information processing system as claimed in claim 7, wherein said first element includes a second register which stores information indicating that there is a failure on the path from said first element to said third element.

13. A method for providing an alternative path for an information processing system which includes a first system, to which a first device is connected, that produces a request for said first device and a second system which is independent from said first system, wherein said first system includes a first element and a third element which is provided between said first element and said first device, wherein said second system includes a second element, comprising:
   first, outputting said request from said first element to said second element;
   second, outputting said request from said second element to said third element; and
   third, outputting said request from said third element to said first device.

14. The method as claimed in claim 13, wherein said first element outputs said request to said second element when there is a failure on the path from said first element to said third element.

15. The method as claimed in claim 13, wherein said first element outputs said request to said third element when there is not a failure on the path from said first element to said third element.

16. The method as claimed in claim 13,
   wherein said first element includes a first register which stores information indicating said second system as an alternative path;
   wherein said first register is accessed during said first outputting step.

17. The method as claimed in claim 13, further comprising:
   determining whether said request is to be sent in said first system or to said second system based on an address of said request and whether or not there is a failure on the path from said first element to said third element.

18. The method as claimed in claim 17,
   wherein said first element includes a second register which stores information indicating that there is a failure on the path from said first element to said third element
   wherein said first register is accessed during said determining step.

* * * * *